United States Patent
Asaoka et al.

[19]

[11] Patent Number: 5,878,340
[45] Date of Patent: Mar. 2, 1999

[54] RADIO TELECOMMUNICATION APPARATUS FOR USE IN RADIO TELECOMMUNICATION SYSTEM

[75] Inventors: Yoshiharu Asaoka; Shinya Takahashi; Takashi Sakagawa, all of Tokyo, Japan

[73] Assignee: Kabushiki Kaisha Toshiba, Kawasaki, Japan

[21] Appl. No.: 590,879

[22] Filed: Jan. 24, 1996

[30] Foreign Application Priority Data

Jan. 25, 1995 [JP] Japan ..................................... 7-009609

[51] Int. Cl.[6] ........................................................ H04B 1/38
[52] U.S. Cl. ........................... 455/422; 455/455; 455/564; 455/575
[58] Field of Search .................................. 455/33.1, 33.2, 455/33.4, 34.1, 34.2, 53.1, 54.1, 54.2, 56.1, 403, 410, 411, 418, 419, 422, 432, 433, 434, 435, 450, 455, 456, 457, 550, 551, 560, 564, 565, 566, 575; 379/59, 60, 63

[56] References Cited

U.S. PATENT DOCUMENTS

5,101,500  3/1992  Marui ...................................... 455/33.1
5,384,825  1/1995  Dillard et al. ........................... 455/564
5,551,073  8/1996  Sammarco ............................... 455/54.1

*Primary Examiner*—Thanh Cong-Le
*Attorney, Agent, or Firm*—Banner & Witcoff, Ltd.

[57] ABSTRACT

When a vehicle radio telephone has transmitted a call signal, a base-station/control-station suspends the communication channel. After the base-station/control-station transmits a PIN transmission request signal to the vehicle radio telephone via the communication channel, a liquid crystal display 452 incorporated in the telephone displays a PIN transmission request. Operating a key section 430 in the telephone generates a flash operation signal. When the base-station/control-station has received the flash operation signal, it transmits a telephone number transmission request signal. At this time, the PIN transmission request on the display 452 is erased, and a PIN is read from an ID/ROM and a PIN code signal is transmitted. Upon receiving the PIN code signal, the base-station/control-station examines whether or not the PIN indicated by the PIN code signal identical to a registered one. If they are identical to each other, the vehicle radio telephone is connected to a destination with an already received telephone number. Thus, the PIN can be easily and reliably transmitted from the vehicle radio telephone to the base-station/control-station.

17 Claims, 6 Drawing Sheets

RADIO TELECOMMUNICATION APPARATUS FOR USE IN RADIO TELECOMMUNICATION SYSTEM

BACKGROUND OF THE INVENTION

1. Field of the Invention

The present invention relates to a radio telecommunication apparatus for use in a radio telecommunication system such as a cellular mobile telephone system which performs channel connection by a PIN (Personal Identification Number) service.

2. Description of the Related Art

In the conventional cellular mobile telephone system, PIN services are offered to prevent a mobile radio telephone (such as a vehicle telephone, a portable telephone, etc.) from being used by an unexpected person. The PIN is a personal identification number specifying one of mobile radio telecommunication terminals and is different from a MIN (Mobile Identification Number). This MIN is recorded on the telephone directory or the like, whereas the PIN is not recorded on the telephone directory or the like and is assigned for each terminal by a proprietor. The PIN service using this PIN will be explained below.

In the PIN service, when a mobile radio telephone has originated a call, a call signal corresponding to this call origination is transmitted to a base-station/control-station through a radio channel. Upon receiving the call signal, the base-station/control-station suspends a communication channel and requests the mobile radio telephone to transmit a PIN assigned thereto. Upon receiving the PIN, the base-station/control-station compares it with a prestored PIN, and performs a switching operation concerning a telephone number transmitted from the mobile radio telephone, only if the both PINs are identical to each other. In the case where no PIN services are offered, a series of switching operations beginning with processing of a call origination and input of a telephone number are performed, and the communication channel is released when the communication has terminated.

Figure 1:
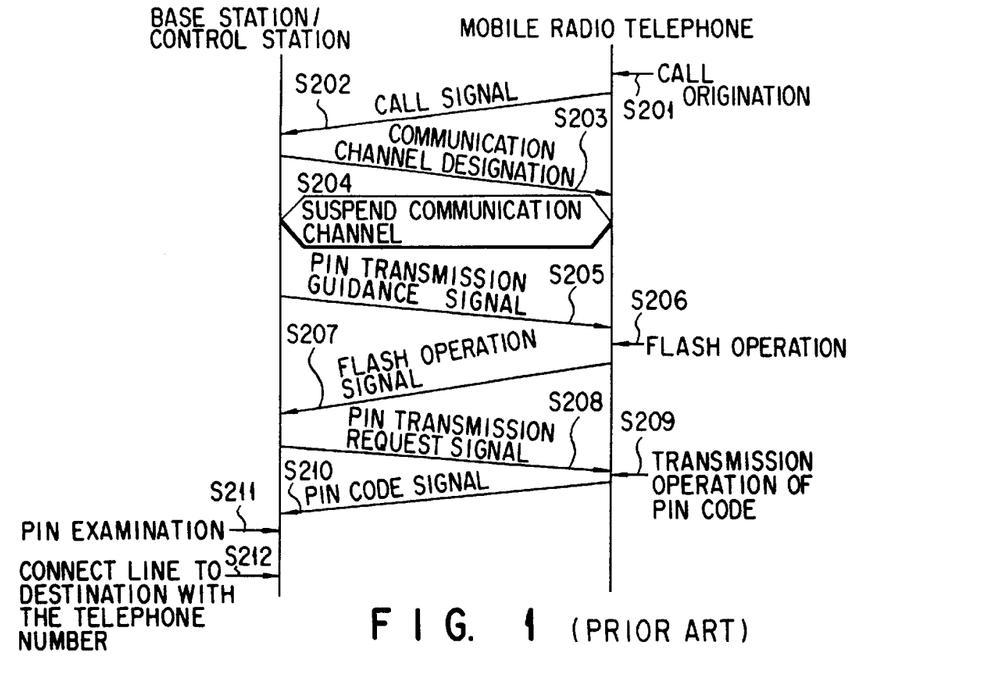
FIG. 1 is a view, showing a sequence of PIN services employed in the conventional mobile telephone system.

FIG. 1 shows a sequence of PIN services in the conventional cellular mobile telephone system. As is shown in FIG. 1, first, the user of a mobile radio telephone performs a call origination (step S201). More specifically, the user pushes a call key of a key section incorporated in the telephone, and at the same time designates the telephone number of a destination. As a result, a call signal including the destination number is transmitted to the base-station/control-station (step S202).

When the base-station/control-station has received the call signal, it extracts the telephone number designated by the call signal, and then transmits a communication channel designating signal to the mobile radio telephone (step S203), thereby suspending the communication channel (step S204).

Thereafter, the base-station/control-station transmits a PIN guidance signal to the mobile radio telephone (step S205). Thus, the user is informed of a guidance through the speaker, etc. of the telephone.

The user performs a flash operation using the guidance (step S206). Specifically, the user pushes a particular function key in the key section to notify the base-station/control-station of that a PIN code will be transmitted. As a result, a flash operation signal of a single tone (e.g. 400 ms, 10 Kz) is transmitted from the mobile radio telephone (step S207).

Upon receiving the flash operation signal, the base-station/control-station prepares for reception of the PIN code signal, and supplies the mobile radio telephone with a PIN-input request signal (step S208).

When the mobile radio telephone has received the PIN-input request signal from the base-station/control-station, the user performs an operation for inputting the PIN code which he has in mind (step S209).

Subsequently, a PIN code signal based on the input PIN code is transmitted to the base-station/control-station (step S210).

Upon receiving the PIN code signal from the mobile radio telephone, the base-station/control-station retrieves a pre-registered PIN corresponding to the telephone number extracted on the basis of the call signal, and determines whether or not the PIN indicated by the PIN code signal is identical to the pre-registered one (step S211). If they are identical to each other, the base-station/control-station connects the mobile radio telephone, which has originated the call, to the destination with the designated telephone number (step S212). Thereafter, the user who has originated the call communications with a person at the destination. After the communication, the communication channel (radio channel W) is released.

As explained above, in the conventional PIN services employed in a cellular mobile radio telephone, etc., the user inputs the PIN code of the telephone, and the channel to a destination is connected if the PIN code is identical to that registered in the base-station/control-station. Accordingly, a communication with an unexpected person can be avoided.

However, in the above-described conventional cellular telephone system, the PIN code must be input each time a call is originated by a mobile radio telephone, which makes the call operation complicated. If an erroneous PIN is input, the input of the PIN must be repeated, which makes the call origination more complicated. In addition, if the user forgets the PIN of the mobile radio telephone, he cannot use the PIN services and accordingly the telephone.

SUMMARY OF THE INVENTION

It is the object of the present invention to provide a radio telecommunication apparatus for use is a radio telecommunication system, capable of easily and reliably transmit a PIN to a base station in the radio telecommunication system.

To attain the object, there is provided a radio telecommunication apparatus for use in a radio telecommunication system, wherein the radio telecommunication system encompasses a plurality of areas each having one or more base units which check an identification number indicative of the radio telecommunication apparatus and communicates with the radio telecommunication apparatus over one or more radio channels within the areas of the base units, the radio telecommunication apparatus comprising memory means for storing the identification number a first receiving means for receiving a signal which is transmitted from the base station and requests an input of a predetermined information input means, responsive to the first receiving means receiving the signal which requests the input of the predetermined information, for inputting the predetermined information; a first transmitting means for transmitting a signal which corresponds to the predetermined information input by the input means; a second receiving means for receiving a signal which is transmitted from the base unit responding to the signal corresponding to the predetermined information transmitted by the first transmitting means and requests a transmission of the identification number; and a second transmitting means, responsive to the second receiving means receiving the signal which requests the transmission of the identification number, for reading out the identification number from the memory means and transmitting the identification number.

The above-described a radio telecommunication apparatus may further include means for determining whether or not the second receiving means has received the signal which requests a transmission of the identification number within a predetermined period of time after the transmission of the signal which corresponds to the predetermined information. The determining means may include means for counting the predetermined time period.

Moreover, the radio telecommunication system may further include means for releasing a corresponding radio channel when the determining means determines that the signal which requests a transmission of the identification number has not been received.

The telecommunication apparatus may further include informing means for informing the user of a failure in the reception of the signal which requests a transmission of the identification number when the determining means determines that the signal which requests a transmission of the identification number has not been received. In this case, the informing means may include a display, means for generating a synthetic sound, or means for generating a beep sound.

The telecommunication apparatus may further include means for originating a call. In this case, the telecommunication apparatus may further include means responsive to the means originating the call for determining, before the number of the call origination reaches a predetermined value, whether or not the signal which requests a transmission of the identification number has received. The determining means may include means for counting the number of the call origination.

Moreover, the radio communication system may include means for releasing a corresponding radio channel when the determining means determines that the signal which requests a transmission of the identification number has not been received. In this case, the radio telecommunication apparatus may include informing means for informing the user of a failure in the reception of the signal which requests a transmission of the identification number when the determining means determines that the identification number transmission request signal has not been received. Moreover, the informing means may include a display, means for generating a synthetic sound, or means for generating a beep sound.

The radio telecommunication apparatus may further include means for storing a table showing a plurality of system identification numbers and identification numbers corresponding to the system identification numbers; means responsive to a signal indicative of a predetermined system identification number transmitted from the base unit, for reading a identification number corresponding to the signal with reference to the table; and means for transmitting the read identification number to the base unit. In this case, the radio telecommunication apparatus may further include means for reading a identification number corresponding to another system identification number when the table does not store the identification number corresponding to the predetermined system identification number transmitted from the base unit.

Moreover, the radio telecommunication apparatus may comprise a cellular radio telecommunication apparatus system.

In addition, the radio telecommunication apparatus includes informing means, responsive to the first receiving means receiving the signal which requests the input of the predetermined information, for outputting information corresponding to the signal which requests the input of the predetermined information. In this case, the informing means includes a speaker for outputting the information by a sound corresponding to the signal which requests the input of the predetermined information, or a display for visually outputting that.

Additional objects and advantages of the present invention will be set forth in the description which follows, and in part will be obvious from the description, or may be learned by practice of the present invention. The objects and advantages of the present invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the present invention and, together with the general description given above and the detailed description of the preferred embodiments given below, serve to explain the principles of the present invention in which.

DETAILED DESCRIPTION OF THE PREFERRED EMBODIMENTS (First Embodiment)

Figure 2:
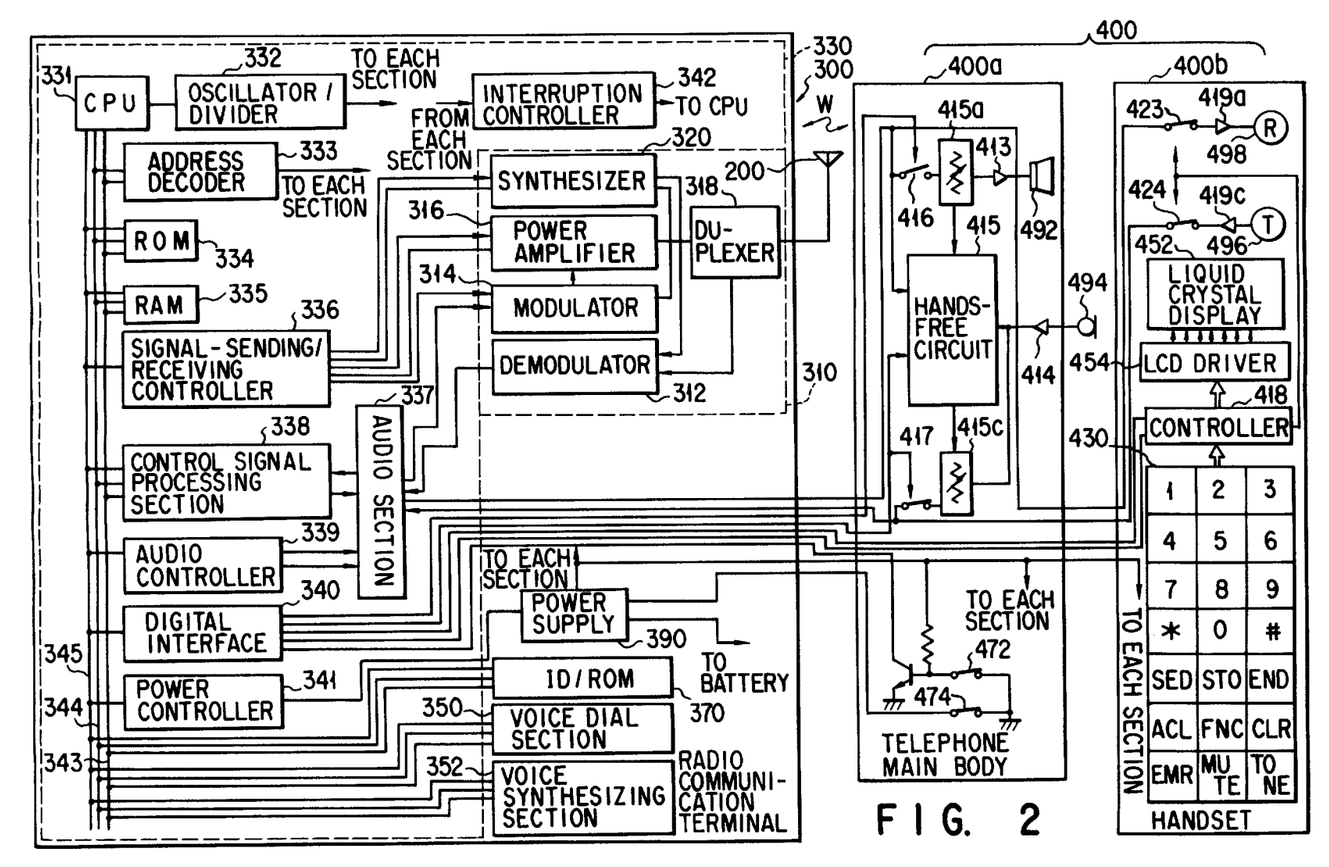
FIG. 2 is a block diagram, showing a mobile radio telecommunication system according to the embodiments of the present invention.

FIG. 2 is a block diagram, showing the overall structure of a mobile radio telephone used by the user in a mobile radio telecommunication system. In this embodiment, a vehicle radio telephone is employed as an example of the mobile radio telephone. The vehicle radio telephone comprises an external antenna 200 for performing communication with a base-station/control-station (not shown), etc. through a radio channel W, a radio communication terminal 300 installed in the trunk of the vehicle, etc., and a telephone 400 installed in the vehicle near the driver's seat, etc. (which consists of a telephone main body 400a and a handset 400b).

The radio communication terminal 300 comprises a transmission signal processing section 310 for processing transmission signals through the radio channel W and the external antenna 200, a main controller 330 for controlling the overall system, a voice dial section 350 for performing voice recognition and voice synthesis, a voice synthesizing section 352 for synthesizing voices to perform various types of alarm, an ID/ROM 370 for registering a PIN assigned to the vehicle radio telephone, the ID number of the mobile radio telecommunication system and telephone numbers, and a power section 390 for supplying stabilized voltage to each section of the system.

The transmission signal processing section 310 has a demodulator 312, a modulator 314 for modulating an audible sound, a power amplifier 316 for amplifying the modulated signal to a predetermined transmission level, a duplexer 318 and a synthesizer 320.

The main controller 330 has a CPU 331 for controlling the structural elements of the main controller 330, an oscillator/divider 332, an address decoder 333, a ROM 334, a working RAM 335, a transmission controller 336, an audio section 337, a control signal processing section 338 and an audio controller 339.

The main controller 330 further has a digital interface (I/F) 340, a power controller 341, an interruption controller 342, a data bus line 343, an address bus line 344, and a control bus line 345. These bus lines are, for example, of 8 bits and connect the elements of the main controller 330 to each other.

The telephone main body 400a has amplifiers 413 and 414, a hands-free circuit 415, switches 416 and 417, a hands-free microphone 494, a speaker 492, a hook switch 472, and an on/off switch 474.

The handset 400b has a controller 418, amplifiers 419a and 419c, switches 423 and 424, a liquid crystal display (LCD) 452, an LCD driver 454, a key section 430 consisting of a plurality of key pads, a handset microphone 496, and a handset receiver 498.

The function of each section of the vehicle radio telephone will now be explained in detail.

In the transmission signal processing section 310, the demodulator 312 demodulates reception signals (an audible voice signal, a control signal) input thereto via the radio channel W, the external antenna 200 and the duplexer 318. The modulator 314 modulates the audible voice signal and the control signal, and outputs the modulated signals to the power amplifier 316.

The power amplifier 316 amplifies the modulated signal output from the modulator 314, to a high frequency signal of a predetermined power, outputs the amplified signal to the duplexer 318, and transmits it via the external antenna 200. The duplexer 318 performs processing for separating a reception signal and a transmission signal, since it uses the external antenna 200 for both receiving and transmitting signals. The synthesizer 320 determines the frequency of a transmission signal, and outputs a local oscillation signal or a transmission frequency signal.

In the main controller 330, the CPU 331 controls each element of the main controller 330, while the oscillator/divider 332 outputs a clock signal to the CPU 331, and outputs clock signals of desired frequencies to the elements. The address decoder 333 is responsive to instructions from the CPU 331 for transmitting an address signal to each element. The ROM 334 outputs control programs stored therein. The working RAM 335 temporarily stores processing data from the CPU 331.

The transmission signal controller 336 controls the transmission signal processing section 310 on the basis of the control of the CPU 331. For example, the controller 336 controls the frequency set by the synthesizer 320, the amplification factor of the power amplifier 316, the modification factor of the modulator 314, etc. Further, the controller 336 supplies the CPU 331 with an out-of-cycle signal from the synthesizer 320, an output signal indicative of the power of the power amplifier 316, etc.

The audio section 337 transmits, to the control signal processing section 338, a control signal included in reception signals demodulated by the demodulator 312. Further, the section 337 transmits an audible voice signal to the voice dial section 350 and the telephone 400, and transmits, to the modulator 314, the control signal output from the control signal processing section 338 and the audible voice signal output from the telephone 400 and the voice dial section 350. Moreover, the audio section 337 transmits the audible signal from the voice synthesis section 352, to the telephone 400, and performs filtering and wave-shaping of a control signal to be transmitted to the control signal processing section 338 and filtering of a control signal to be transmitted to the modulator 314.

The control signal processing section 338 performs synchronization with respect to the bit and frame of the control signal from the audio section 337. Further the control signal processing section 338 converts, to a parallel signal, control data contained in a control signal output as a serial signal from the base station, and also converts, to a control signal as a serial signal, control data to be output as a parallel signal to the base station, thereby transmitting the the control data to the audio section 337.

The audio controller 339 controls the audio section 337 in various manners. For example, the controller 339 performs switch control to transmit a reception signal from the audio section 337 to one of the control signal processing section 338, the voice dial section 350 and the telephone 400, and also to cause the audio section 337 to fetch a transmission signal output from one of the control signal processing section 338, the voice dial section 350 and the telephone 400.

The digital interface 340 causes the radio communication terminal 300 to interface with the telephone 400. The power controller 341 controls the power section 390. Specifically, the power controller 341 controls the power section 390 so as to set a voltage supplied from a battery (not shown) to a predetermined value, and to supply the voltage to each element. The interruption controller 342 is responsive to an interruption instruction from each element for interrupting the operation of the CPU 331.

In the telephone main body 400a, the amplifier 413 amplifies a voice signal output from the audio section 337 of the radio communication terminal 300, and transmits the amplified signal to the speaker 492. The amplifier 414 amplifies a voice signal supplied from the hands-free microphone 494, and supplies the amplified signal to the audio section 337. The hands-free circuit 415 prevents howling as a result of acoustic combination of a transmission voice signal from the hands-free microphone 494 and a reception voice signal from the speaker 492.

The switch 416 is closed and opened to output a voice signal from the audio section 337 through the speaker 492, and to interrupt the output operation, respectively. On the other hand, the switch 417 is closed and opened to transmit a voice signal from the hands-free microphone 494 to the audio section 337, and to interrupt the transmission, respectively. The switching of the switches 416 and 417 is controlled by a control signal output from the main controller 330. The hook switch 472 detects the on-hook state and the off-hook state of the handset 400b. The detection signal is transmitted to the digital interface 340 of the radio communication terminal 300. The on/off switch 474 turns on and off the vehicle telephone system, and its switch signal is transmitted to the power section 390 of the radio communication terminal 300.

In the handset 400b, the controller 418 controls the overall operation of the handset 400b on the basis of control signals supplied from the main controller 330 of the radio communication terminal 300, and also supplies the main controller 330 with a control signal output from the key section 430, etc. The amplifier 419a amplifies a voice signal from the audio section 337 and transmits it to the handset receiver 498. The amplifier 419c amplifies a voice signal from the handset microphone 496, and outputs it to the audio section 337.

The switch 423 is closed and opened to output a voice signal from the audio section 337 through the handset receiver 498, and to interrupt the output operation, respectively. The switch 424 is closed and opened to transmit a voice signal from the handset microphone 496 to the audio section 337, and to interrupt the transmission, respectively. The switching of the switches 423 and 424 is controlled by the controller 418. The liquid crystal display 452 comprises a number display section for displaying numbers of several digits, and a function display section for displaying various functions. The LCD driver 454 drives the liquid crystal display 452 under the control of the controller 418 to cause the same to perform a predetermined display. The key section 430 has key pads consisting of ten keys 0–9, function keys such as "*, #, SED, STO, END, RCL, FNC, CLR, EMR, MUTE, TONE", etc. The controller 418 recognizes the pushed state of each key pad.

An explanation will now be given of how the PIN assigned to the vehicle radio telephone is registered in the ID/ROM 370.

The PIN is registered, for example, using the "FNC" key and one of ten keys "0–9" in the key section 430. Pushing the keys of "Password"+"FNC"+"1" causes the CPU 331 to set a register mode, in which mode the PIN (e.g. consisting of a number of 4 digits) is input using ten keys. Then, the "STO" key of the key section 430 is pushed to write the PIN in the ID/ROM 370. The register mode can be released by pushing the "CLR" key of the key section 430.

When, for example, the registered PIN is forgotten, it can be confirmed using the "FNC" key and the ten keys "0–9". Specifically, the PIN written in the ID/ROM 370 can be read therefrom and displayed on the liquid crystal display 452 by pushing the keys of "Password"+"FNC"+"2". After a predetermined period of time passes, the CPU 331 automatically erases the displayed PIN. Alternatively, the displayed PIN may be erased by manually operating a predetermined key of the key section 430. In any case, the user uses his secret number, which prevents registering or confirming of the PIN by an unexpected person.

The operation of the above-described first embodiment will be explained.

Figure 3:
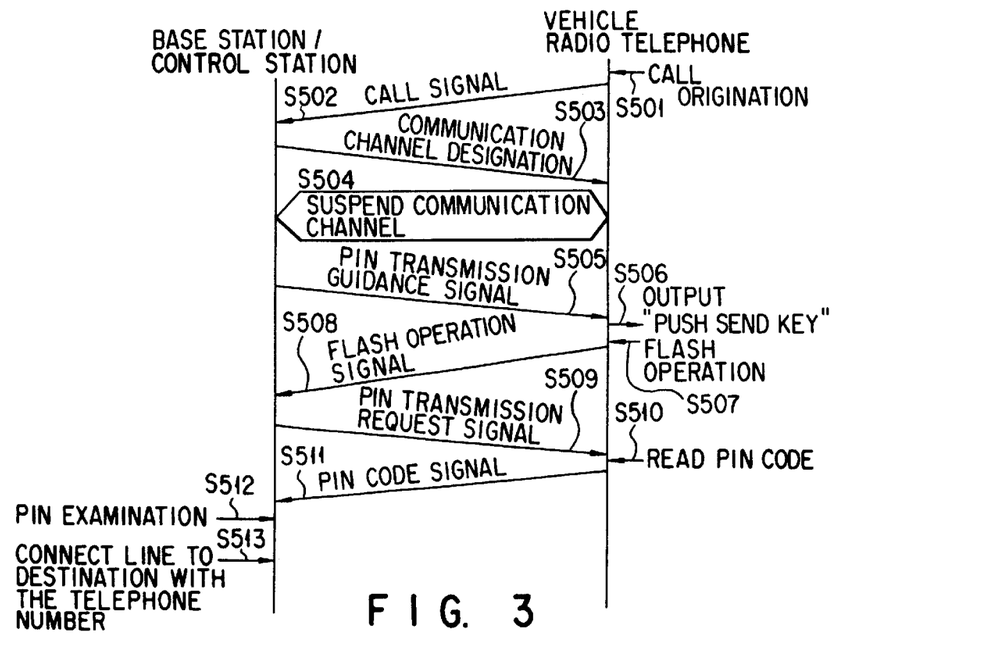
FIG. 3 is a view, showing a sequence of operations, according to a first embodiment, for automatically transmitting a PIN.

FIG. 3 is a view, showing a sequence of operations to be performed to automatically transmit the PIN. As is shown in FIG. 3, first, the user of the vehicle radio telephone originates a call by pushing a call key of the key section 430 (step S501) and simultaneously designating the telephone number of a destination. As a result, a call signal which contains data indicative of the telephone number of the destination is transmitted to a base-station/control-station (not shown) via the main controller 330, the transmission signal processing section 310 and the external antenna 200 incorporated in the vehicle radio telephone, and via the radio channel W (step S502).

Upon receiving the call signal from the vehicle radio telephone, the base-station/control-station extracts the designated telephone number therefrom, and transmits a communication channel (CH) designation signal to the vehicle radio telephone via the radio channel w (step S503). Thus, the communication channel is suspended (step S504).

Then, the base-station/control-station transmits a PIN guidance signal to the vehicle radio telephone via the radio channel W (step S505). As a result, a guidance speech urging pushing a certain key, such as "push SEND key", is output through the speaker 492 of the telephone (step S506). Alternatively, a simple voice such as a beep sound, which indicates that a predetermined key is to be pushed, may be generated through the speaker 492, or the contents of the guidance may be displayed on the liquid crystal display 452.

In accordance with the guidance, the user performs the flash operation (step S507). Specifically, the user pushes a particular function key of the key section 430 to notify the base-station/control-station that the PIN code will be transmitted. As a result, a flash operation signal of a single tone (e.g. 400 ms, 10 KHz) is transmitted from the vehicle radio telephone to the station via the radio channel W (step S508).

Upon receiving the flash operation signal, the base-station/control-station prepares for receiving the PIN code signal, and then transmits a signal requesting transmission of the PIN to the vehicle radio telephone via the radio channel W (step S509).

When the vehicle radio telephone has received the request signal, it recognizes that preparation by the base-station/control-station for receiving the PIN code signal has been completed, and hence reads the PIN code assigned to itself and prestored in the ID/ROM 370 (step S510). Before the reading of the PIN code, data previously displayed on the liquid crystal display 452 of the vehicle radio telephone is erased. In addition, during the reading of the PIN code, the display 452 may display, for example, the statement "PIN IS BEING READ".

Thereafter, a PIN code signal based on the read PIN code is transmitted via the radio channel W to the base-station/control-station (step S511). At this time, the previous statement displayed on the liquid crystal display 452 may be erased, and instead the statement "PIN IS BEING TRANSMITTED" be displayed.

When the base-station/control-station has received the PIN code signal, it retrieves a prestored PIN which corresponds to the telephone number extracted from the call signal, and determines whether or not the retrieved PIN is identical to the PIN indicated by the received PIN code signal (step S512). If they are identical to each other, the base-station/control-station connects the vehicle radio telephone, which has originated the call, to a vehicle radio telephone corresponding to the designated telephone number (step S513). After communication therebetween terminates, the communication channel (radio channel W) is released.

As explained above, when in the first embodiment, the vehicle radio telephone has received a PIN transmission guidance signal for the PIN services, a guidance indicating that the flash operation should be performed is displayed on the display of the telephone. As a result, the PIN will almost automatically be transmitted only by the user's performing the flash operation in accordance with the guidance. In other words, upon receiving the PIN transmission request signal from the base-station/control-station, the PIN assigned to and stored in the vehicle radio telephone is automatically read, and a PIN code signal indicative of the PIN is automatically transmitted to the base-station/control-station.

Accordingly, it is not necessary to input the PIN each time the call origination has been performed, and also not necessary to repeat the input operation because of erroneous input of the PIN. Moreover, even when the PIN of the telephone is forgotten, the PIN services can be used. Thus, the PIN assigned to the telephone can be easily and reliably transmitted to the base-station/control-station.

An explanation will now be given of an embodiment (a second embodiment), which can eliminate the disadvantage which may occur, for example, where the vehicle with the vehicle radio telephone has moved far from the base-station/control-station, and hence the telephone cannot receive the PIN transmission request signal because of a reduction in the intensity of the electric field of the signal.

(Second Embodiment)

A vehicle radio telephone according to a second embodiment has the same structure as the first embodiment (FIG. 2), and therefore its explanation is omitted.

The operation of the second embodiment will be explained.

Figure 4:
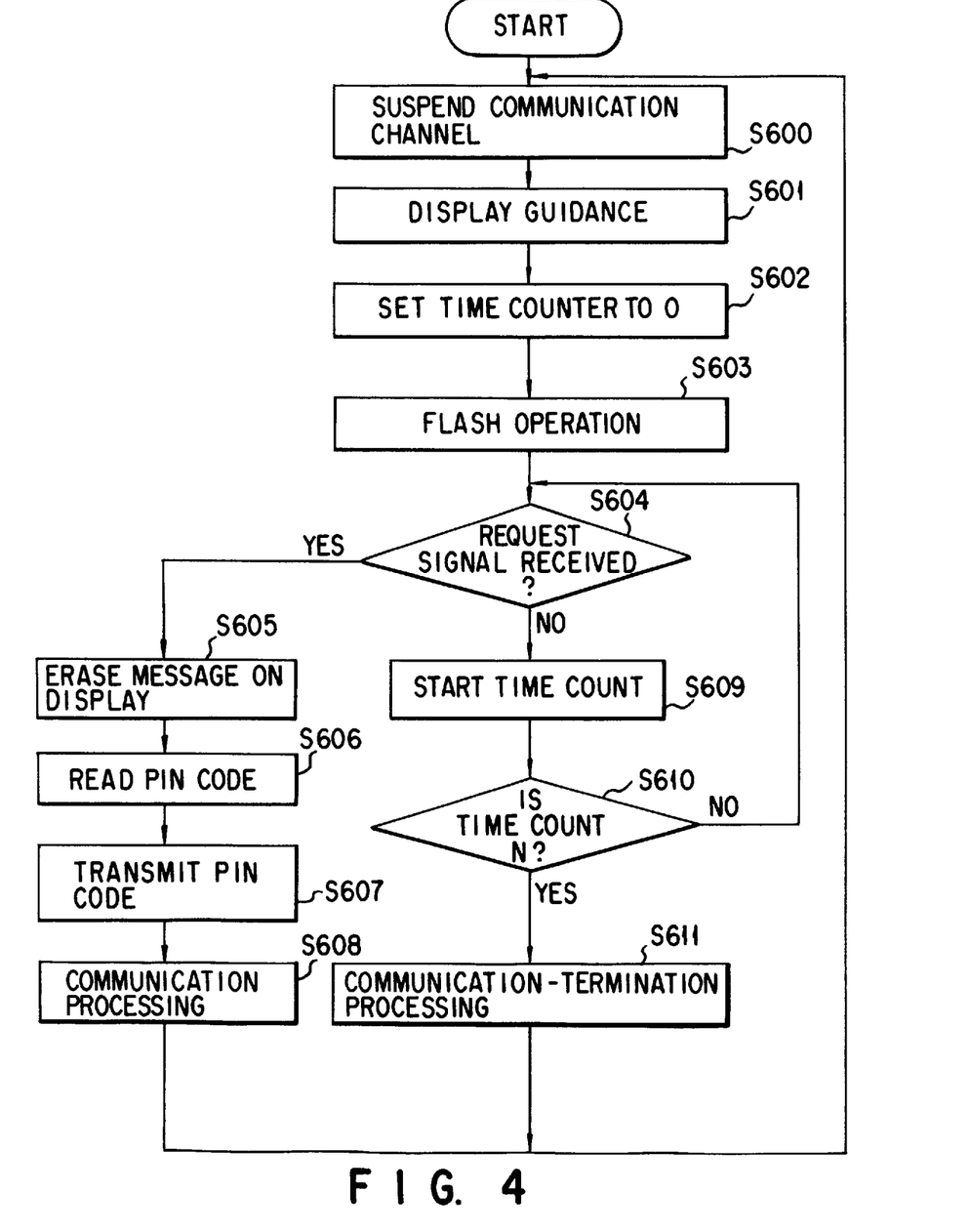
FIG. 4 is a flowchart, illustrating the procedure of processing, according to a second embodiment, performed when a signal indicative of a selective number transmission request is not received by a moving vehicle radio telephone.

FIG. 4 is a flowchart, illustrating the procedure of processing performed when the vehicle with the radio telephone has moved too far, and the telephone cannot receive the PIN transmission request signal output from the base-station/control-station.

When also in the second embodiment, the user has performed a call origination, a call signal containing data indicative of the telephone number of a destination is transmitted to the base-station/control-station via the radio channel W. Subsequently, the communication channel (CH) designation signal is transmitted from the base-station/control-station to the vehicle radio telephone via the radio channel W, thereby suspending the communication channel (CH) (step S600). Then, the PIN guidance signal is transmitted from the base-station/control-station to the telephone via the radio channel W, and the contents of the guidance is displayed on the liquid crystal display 452 as in the case of the first embodiment (FIG. 3) (step S601).

At this time, the CPU 331 resets its time counter (not shown) to zero (step S602).

Then, the user performs the flash operation in accordance with the guidance (step S603). Specifically, the user pushes a particular function key of the key section 430 to notify the base-station/control-station of that the PIN code will be transmitted. As a result, a flash operation signal of a single tone (e.g. 400 ms, 10 KHz) is transmitted from the vehicle radio telephone to the station via the radio channel W.

Thereafter, the CPU 331 determines whether or not the PIN transmission request signal has been normally received by the vehicle radio telephone (step S604).

If the PIN transmission request signal is normally received, the CPU 331 performs normal communication processing. In this case, data previously displayed on the liquid crystal display 452 of the telephone is erased (step S605), and the PIN code assigned to the telephone is read from the ID/ROM 370 (step S606). A PIN code signal corresponding to the read PIN code is transmitted to the base-station/control-station via the radio channel W (step S607). Then, the base-station/control-station connects the vehicle radio telephone, which has originated the call, to the destination, thereby allowing a communication therebetween (step S608). After the communication terminates, the communication channel (radio channel W) is released, followed by the program returning to the step S600.

On the other hand, if the PIN transmission request signal is not received by the vehicle radio telephone in the step S604, the CPU 331 starts counting of time (step S609).

Subsequently, the CPU 331 determines whether or not the count value has reached a predetermined value N (step S610). If the count value does not reach the predetermined value N, the program returns to the step S604, where the CPU 331 again determines whether or not the PIN transmission request signal output from the base-station/control-station is normally received by the vehicle radio telephone. By virtue of the step S610, communication-termination processing (which will be performed in a step S611) is suspended until the count value reaches the predetermined value N. In other words, until then, the possibility of reception of the PIN transmission request signal is taken into consideration.

If the count value reaches the predetermined value N in the step S610, communication-termination processing is performed under the control of the CPU 331 (step S611). At this time, the CPU 331 informs the user of a failure in signal reception by, for example, displaying a message indicative of the failure on the liquid crystal display 452 or by generating a beep sound or a synthetic sound through the speaker. Thereafter, the communication channel (radio channel W) is released, and the program returns to the step S600.

As described above, the second embodiment can provide the following advantage, as well as the advantage obtained from the first embodiment: Where, for example, the vehicle with the radio telephone has moved far from the base-station/control-station, and the telephone cannot receive the PIN transmission request signal because of a reduction in the intensity of the electric field of the signal, the telephone is kept ready to receive the PIN transmission request signal until the count value reaches the predetermined value N. Since the communication-termination processing is thus suspended for a while, the vehicle radio telephone is very serviceable.

Further, if the telephone does not receive the PIN transmission request signal even after the count value reaches the predetermined value N, the user is informed of a failure in signal reception by a message displayed on the liquid crystal display 452 or by a beep sound or a synthetic sound generated through the speaker. This makes the telephone more serviceable.

An explanation will be given of an embodiment (a third embodiment), which can eliminate the disadvantage which may occur, for example, where the vehicle with the radio telephone has moved far from the base-station/control-station, and hence a flash operation signal of a single tone output by the flash operation by the user of the telephone does not reach the base-station/control-station.

(Third Embodiment)

A vehicle radio telephone according to a third embodiment has the same structure as the first embodiment (FIG. 2), and therefore its explanation is omitted.

The operation of the third embodiment will be explained.

Figure 5:
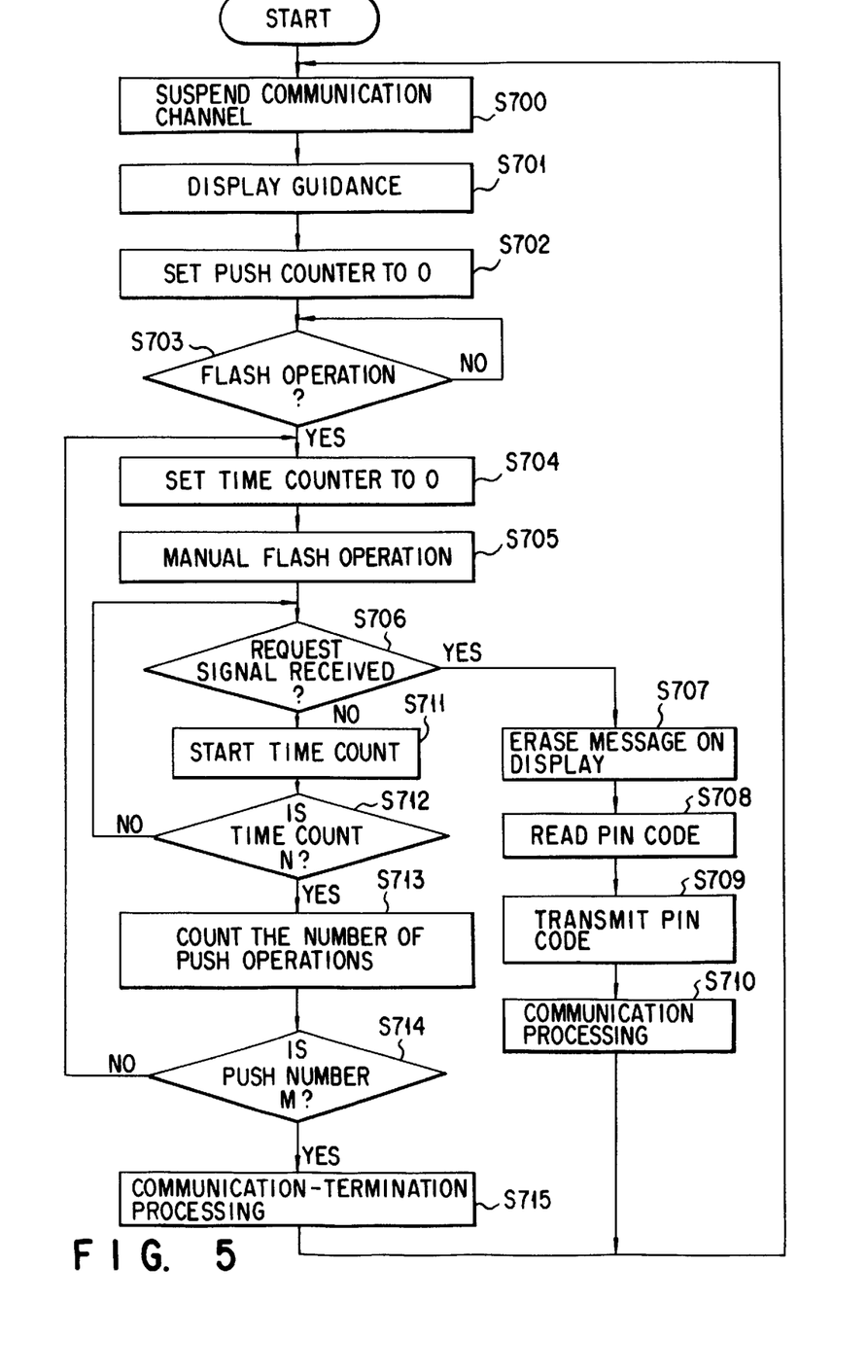
FIG. 5 is a flowchart, illustrating the procedure of processing, according to a third embodiment, performed when a single tone by a flash operation is not transmitted to a base-station/control-station.

FIG. 5 is a flowchart, illustrating the procedure of processing performed when a flash operation signal of a single tone output by pushing a predetermined function key of the key section 430 (by the flash operation) does not reach the base-station/control-station.

When also in the third embodiment, the user has performed a call origination, a call signal containing data indicative of the telephone number of a destination is transmitted to the base-station/control-station via the radio channel W. Subsequently, the communication channel (CH) designation signal is transmitted from the base-station/control-station to the vehicle radio telephone via the radio channel W, thereby suspending the communication channel (CH) (step S700). Then, the PIN guidance signal is transmitted from the base-station/control-station to the telephone via the radio channel W, and the contents of the guidance is displayed on the liquid crystal display 452 as in the case of the second embodiment (FIG. 4) (step S701).

Thereafter, in the third embodiment, the CPU 331 resets, to zero, the counted number of push operations by a push counter (not shown) (step S702), and determines whether or not the flash operation is performed (step S703). If the flash operation is performed, the CPU 331 resets the time count value to zero (step S704). If, on the other hand, the flash operation is not performed, the processing of the step S703 is repeated until the flash operation is performed.

Then, the user manually performs the flash operation in accordance with the guidance (step S705). Specifically, the user pushes a predetermined function key of the key section 430 to notify the base-station/control-station of that the PIN code will be transmitted, thereby transmitting a flash operation signal of a single tone (e.g. 400 ms, 10 KHz) from the vehicle radio telephone to the base-station/control-station via the radio channel W.

The operations performed in steps S706–S712 are similar to those performed in the steps S604–S610 in the second embodiment (FIG. 4).

Specifically, the CPU 331 determines whether or not the PIN transmission request signal has been normally received by the vehicle radio telephone (step S706). If the PIN transmission request signal is normally received, the CPU 331 performs normal communication processing. In this case, data previously displayed on the liquid crystal display 452 of the telephone is erased (step S707), and the PIN code assigned to the telephone is read from the ID/ROM 370 (step S708). A PIN code signal corresponding to the read PIN code is transmitted to the base-station/control-station via the radio channel W (step S709). Then, the base-station/control-station connects the vehicle radio telephone, which has originated the call, to the destination, thereby allowing a communication therebetween (step S710). After the communication terminates, the communication channel (radio channel W) is released, followed by the program returning to the step S700.

On the other hand, if the PIN transmission request signal is not received by the vehicle radio telephone in the step S706, the CPU 331 starts counting of time (step S609). Subsequently, the CPU 331 determines whether or not the count value has reached a predetermined value N (step S712). If the count value does not reach the predetermined value N, the program returns to the step S706, where the CPU 331 again determines whether or not the PIN transmission request signal output from the base-station/control-station is normally received by the vehicle radio telephone. By virtue of the step S712, communication-termination processing (which will be performed in a step S715) is suspended until the count value reaches the predetermined value N. In other words, until then, the possibility of reception of the PIN transmission request signal is taken into consideration.

If the count value reaches the predetermined value N in the step S712, communication-termination processing is not performed immediately, which differs from the second embodiment. Instead, the CPU 331 counts the number of manual push operations for the flash operation (step S713), and then determines whether or not the count number reaches a predetermined value M (step S714). If the count number does not reach the predetermined value M, the program returns to the step S703, where the processing is repeated until the number of the manual push operations for the flash operation reaches the predetermined value M. If the count number of the push operations reaches the predetermined value M, the communication-termination processing is performed under the control of the CPU 331 (step S715). At this time, the CPU 331 informs the user of a failure in signal reception by displaying a message indicative of the failure on the liquid crystal display 452 or by generating a beep sound or a synthetic sound through the speaker. Thereafter, the communication channel (radio channel W) is released, and the program returns to the step S700.

As described above, the third embodiment can provide the following advantage, as well as the advantage obtained by the second embodiment: Even when, for example, the vehicle with the radio telephone has moved far from the base-station/control-station, and a flash operation signal of a single tone output by the flash operation by the user does not reach the base-station/control-station, the communication-termination processing is not performed until the manual flash operation is repeated a predetermined number of times. Accordingly, the vehicle radio telephone is very serviceable.

Further, if the telephone does not receive the PIN transmission request signal while it counts the number of the push operations, it notifies the user of a failure in signal reception by a message displayed on the liquid crystal display 452 or by a beep sound or a synthetic sound generated through the speaker. This makes the telephone more serviceable.

A case where the flash operation is performed not manually but automatically will now be explained.

(Fourth Embodiment)

A vehicle radio telephone according to a fourth embodiment has the same structure as the first embodiment (FIG. 2), and therefore its explanation is omitted.

Figure 6:
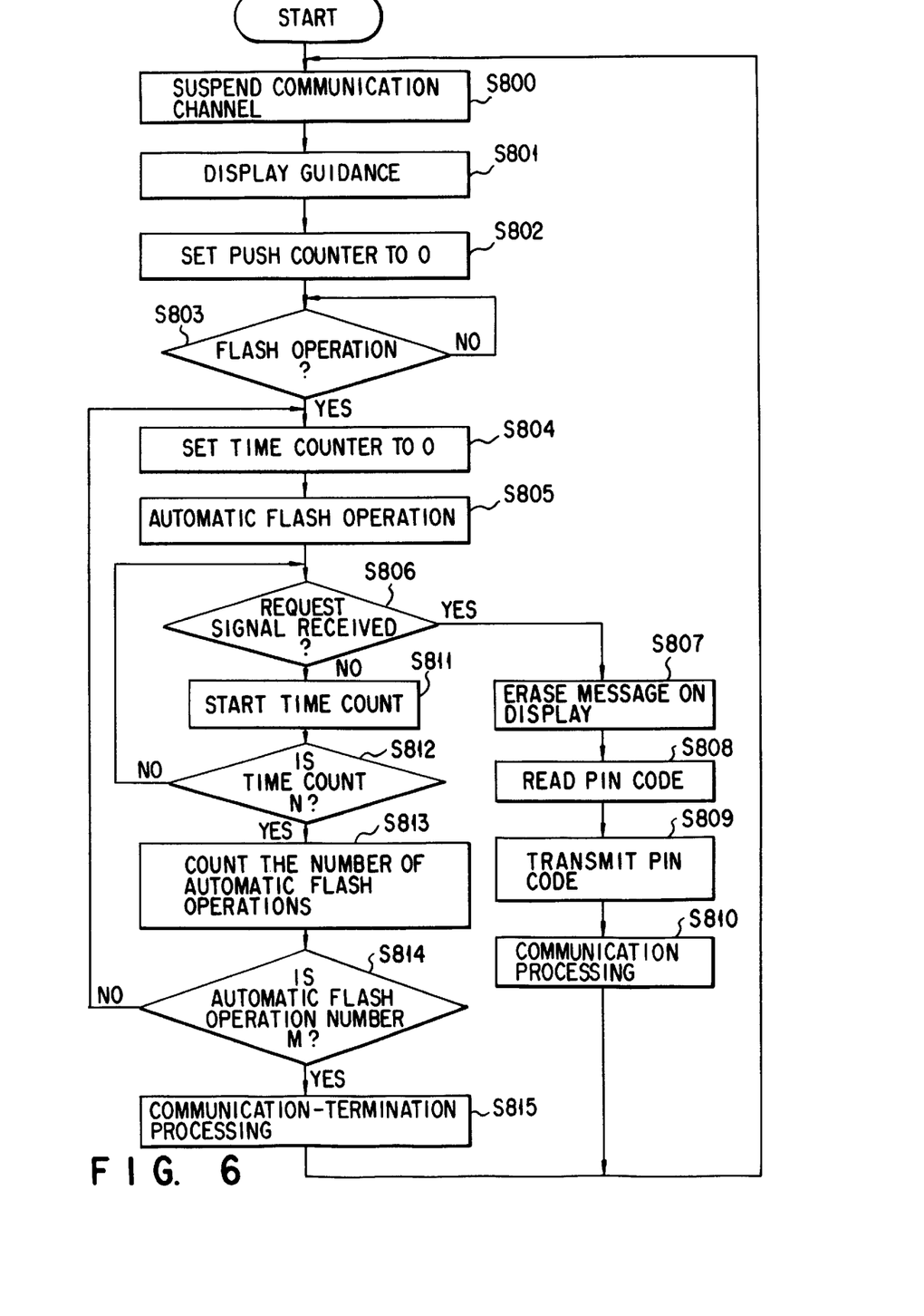
FIG. 6 is a flowchart, illustrating the procedure of processing, according to a fourth embodiment, for automatically repeating PIN operations.

The operation of the fourth embodiment will be explained. FIG. 6 is a flowchart, illustrating the procedure of processing performed for automatic flash operation.

The processes in steps S800–S804 are similar to those in the steps S700–S704 of the third embodiment (FIG. 5).

In the fourth embodiment, an automatic flash operation is performed under the control of the CPU 331 (step S805), thereby transmitting a flash operation signal of a single tone (e.g. 400 ms, 10 KHz) from the vehicle radio telephone to the base-station/control-station via the radio channel W. The processes in steps S806–S812 are similar to those in the steps S706–S712 of the third embodiment.

Thereafter, in the fourth embodiment, the CPU 331 counts the number of automatic push operations for the automatic flash operation (step S813), and then determines whether or not the count number reaches a predetermined value M (step S814). If the count number does not reach the predetermined value M, the program returns to the step S804, where the processing is repeated until the number of the automatic push operations for the automatic flash operation reaches the predetermined value M. If the count number of the push operations reaches the predetermined value M, the communication-termination processing is performed under the control of the CPU 331 (step S815). At this time, the CPU 331 informs the user of a failure in signal reception by displaying a message indicative of the failure on the liquid crystal display 452 or by generating a beep sound or a synthetic sound through the speaker. Thereafter, the communication channel (radio channel W) is released, and the program returns to the step S800.

As described above, the fourth embodiment can provide the advantage that even when, for example, the vehicle with the radio telephone has moved far from the base-station/control-station, and a flash operation signal of a single tone output by the automatic flash operation does not reach the base-station/control-station, the communication-termination processing is not performed until the automatic flash operation is repeated a predetermined number of times. Accordingly, the vehicle radio telephone is very serviceable. Moreover, the degree of signal reception can be increased by setting the time period for allowing repetition of the automatic flash operation, in light of the movement of the vehicle radio telephone.

An explanation will be given of an embodiment wherein PINs are set for mobile radio telecommunication systems with different ID numbers, respectively.

(Fifth Embodiment)

A mobile radio telephone according to a fifth embodiment has the same structure as the first embodiment (FIG. 2), and therefore its explanation is omitted.

Figures 7, 8:
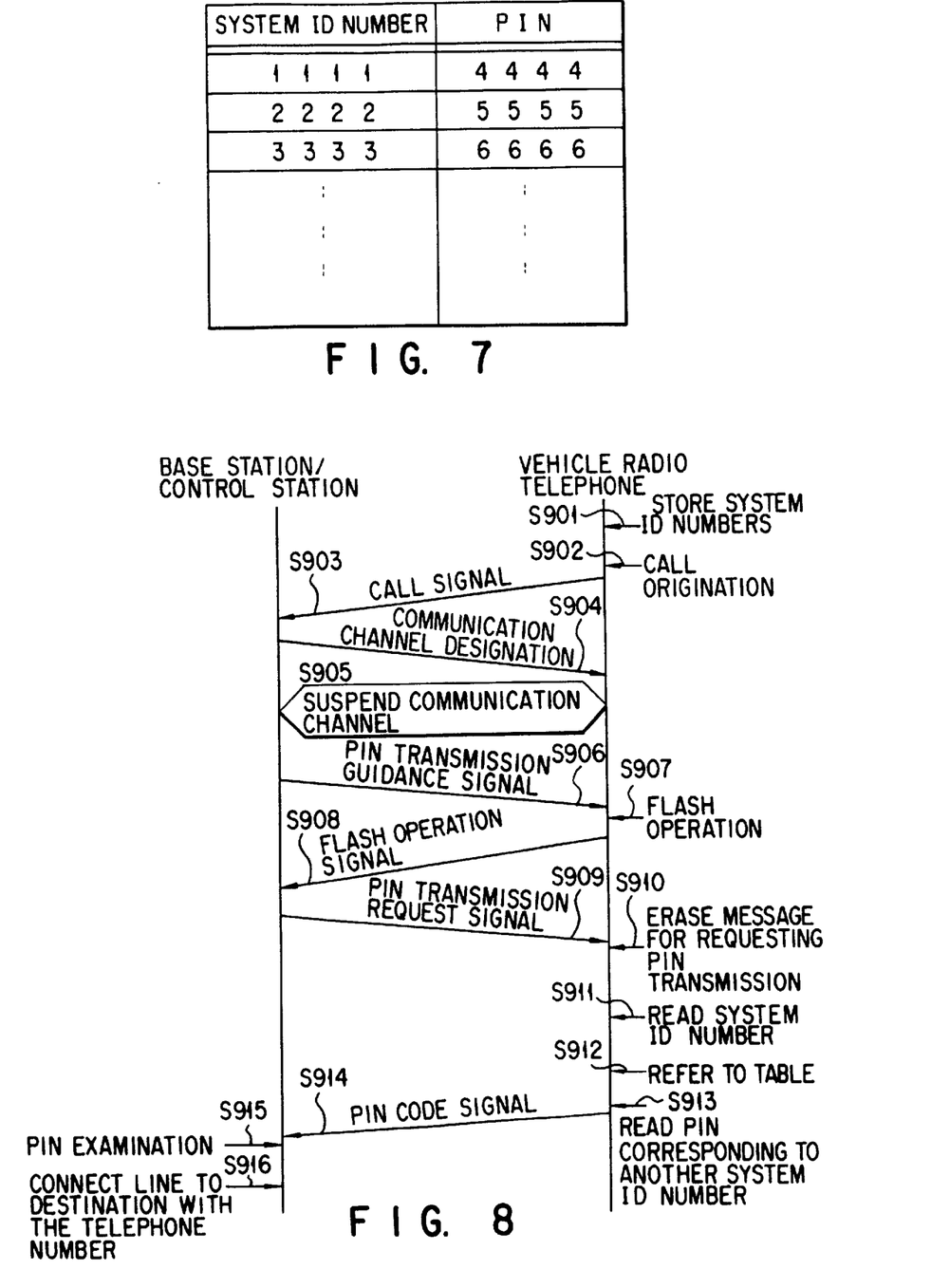
FIG. 7 is a table, showing PINs corresponding to ID numbers of mobile radio telecommunication systems according to a fifth embodiment.
FIG. 8 is a view, showing a sequence of operations, according to a sixth embodiment, for automatically transmitting a PIN.

In the cellular mobile radio telephone services, etc., where a plurality of mobile radio telephone services are offered in the service area of one cell base station, or where a vehicle radio telephone roams between a plurality of service areas, a plurality of system ID numbers and PINs corresponding thereto are prepared. FIG. 7 is a table showing the relationship between system ID numbers "1111, 2222, 3333, . . . " and PINs "4444, 5555, 6666, . . . ". This table is stored in the ID/ROM 370.

The operation of the fifth embodiment will be explained.

A sequence of operations in the fifth embodiment is similar to that employed in the first embodiment (FIG. 3) except in that one of the system ID numbers "1111, 2222, 3333, . . . " shown in the FIG. 7 table is stored in a recording medium through the key section 430 before a call origination is performed.

After the user inputs a system ID number through the key section 430, the CPU 331 recognizes the system ID number. When the base-station/control-station inquires the system ID number, the number is read from the recording medium in the vehicle radio telephone and transmitted to the base-station/control-station. Subsequently, a series of processing based on the sequence of FIG. 3 employed in the first embodiment is performed (specifically, the processing in the steps S501–S513 is performed).

This embodiment may be modified such that the system ID number shown in the FIG. 7 table is input automatically, instead of manual input through the key section 430. In this case, a system ID number is imparted from the base-station/control-station to the vehicle radio telephone, and then the CPU 331 retrieves a corresponding PIN from the FIG. 7 table stored in the ID/ROM 370. Further, the CPU 331 temporarily stores the pair of the system ID number and the PIN in the working RAM 335. After this, the vehicle radio telephone is connected to the base-station/control-station, using the system ID number. In an area in which plural system ID numbers (corresponding to respective service companies) are provided, it is necessary to prevent the system ID number from being switched to the system ID number which is received with a maximum electric field intensity. Further, it is a matter of course that the operation performed after the system ID number is automatically input is the same as that in the manual input case.

In addition, the vehicle radio telephone of the fifth embodiment may be modified such that the FIG. 7 table is referred to only when the system ID number, which the CPU 331 now recognizes, differs from that imparted thereto from the base-station/control-station.

As explained above, in the fifth embodiment, where a plurality of mobile radio telephone services are offered in the service area of one cell base station, or where a vehicle radio telephone roams between a plurality of service areas, a PIN corresponding to a system ID number imparted to the telephone is stored therein, and the PIN is automatically transmitted to the base-station/control-station as in the first embodiment. By virtue of this structure, the vehicle radio telephone can be handled in a simple manner, and the PIN can be reliably transmitted to the base-station/control-station. As a result, reliable channel connection can be realized.

The fifth embodiment can be modified like the second embodiment. Specifically, it can be modified such that the communication-termination processing is not performed until the time count value reaches the predetermined value N, in the case where the PIN transmission request signal cannot be received. Moreover, the fifth embodiment can be constructed, like the third or fourth embodiment, such that the communication-termination processing is not immediately performed by repeating the flash operation manually or automatically in a case where a flash operation signal of a single tone transmitted from the vehicle radio telephone by pushing a predetermined function key of the key section 430 does not reach the base-station/control-station, for example, as a result of movement of the telephone. In addition, the fifth embodiment may be constructed such that the user is notified of a failure in the reception of the PIN transmission request signal by a message displayed on the display screen of the telephone, or by a beep sound, a synthetic sound, etc. generated therefrom.

An explanation will be given of a sixth embodiment wherein a PIN corresponding to an ID number to a mobile radio telecommunication system is automatically read.

(Sixth Embodiment)

A vehicle radio telephone according to the sixth embodiment has the same structure as the first embodiment (FIG. 2), and hence no explanation is given of the structure.

The operation of the sixth embodiment will be explained.

FIG. 8 shows a sequence of operations for automatically reading a PIN corresponding to an ID number assigned to a system. In the sixth embodiment, a table (FIG. 7), which shows the relationship between PINs and ID numbers assigned to mobile radio telecommunication systems, is stored in the ID/ROM 370 as in the fifth embodiment.

As is shown in FIG. 8, a system ID number imparted from the base-station/control-station is stored in the working RAM 335 under the control of the CPU 331 before the user originates a call (step S901). Each time the system ID number changes in accordance, for example, with the change of the radio telephone system service company while the vehicle radio telephone moves, a new system ID number is stored in the working RAM 335. The processing (steps S902–S909) performed from the call origination to the PIN transmission request signal reception is similar to that performed in the steps S501–S509 of the first embodiment (FIG. 3).

When a message indicative of a request for the transmission of a PIN is erased on the liquid crystal display 452 (step S910), the system ID number is read out of the working RAM 335 (step S911). Subsequently, a PIN corresponding to the system ID number is retrieved from the table stored in the ID/ROM 370 (step S912).

If the PIN corresponding to the system ID number is found in the table, the PIN is read and processing similar to that in the steps S511–S513 is performed in steps S914–S916.

In a case where two system ID numbers are imparted, if a PIN corresponding to one of the system ID numbers is not found in the table stored in the ID/ROM 370, a PIN corresponding to the other system ID number is read from the table (S913), thereby performing the processing in the steps S914–S916. In this case, if the PIN code cannot be transmitted to the base-station/control-station, the communication-termination processing is performed.

In the FIG. 7 case where a plurality of system ID numbers such as "1111, 2222, 3333, . . . " are imparted, PINs corresponding to these ID numbers are continuously transmitted to the base-station/control-station. When the transmission of any of the PINs has failed, the communication-termination processing is performed.

As explained above, the sixth embodiment can provide the same advantage as the fifth embodiment, and also the advantage that if a PIN corresponding to one of system ID numbers is not stored, a PIN corresponding to another system ID number is read and transmitted, which enables easy and reliable transmission of the PIN. In the case, for example, of the cellular mobile radio telephone system, radio channel connection can be automatically performed using a home ID number and a roaming ID number.

The sixth embodiment can be modified, like the second embodiment, such that the communication-termination processing is not performed until the time count value reaches the predetermined value N, in the case where the PIN transmission request signal cannot be received. Moreover, the sixth embodiment can be constructed, like the third or fourth embodiment, such that the communication-termination processing is not immediately performed by repeating the flash operation manually or automatically in a case where a flash operation signal of a single tone transmitted from the vehicle radio telephone by pushing a predetermined function key of the key section 430 does not reach the base-station/control-station, for example, as a result of movement of the telephone. In addition, the sixth embodiment may be constructed that the user is notified of a failure in the reception of the PIN transmission request signal by a message displayed on the display screen of the telephone, or by a beep sound, a synthetic sound, etc. generated therefrom.

Although the first through sixth embodiments employ vehicle radio telephones, the present invention is also applicable to radio telephones of other types such as a portable telephone, a cordless telephone, etc. In the case of the cordless telephone, a cordless master machine is made to perform PIN examination like the base-station/control-station, while a cordless slave machine is made to perform PIN transmission like the vehicle radio telephones according to the first through sixth embodiments. Furthermore, the present invention is also applicable to an MCA system.

As is evident from the above, in the mobile radio telecommunication system of the present invention, the radio telecommunication apparatus automatically reads a prestored PIN in response to a PIN transmission request from the base station, and automatically transmits the read PIN to the base station. Only if the radio telecommunication apparatus cannot receive the PIN transmission request signal even after it transmits a flash operation signal and then a predetermined time period passes, the radio channel is disconnected from the base station. By virtue of this structure, the mobile radio telephone can easily and reliably transmit its PIN to the base station.

Moreover, in the mobile radio telecommunication system of the present invention, the radio telecommunication apparatus automatically and repeatedly transmits the read PIN each time a predetermined time period passes, in response to a PIN transmission request from the base station. This enables easier and more reliable transmission of the PIN.

Further, in the mobile radio telecommunication system of the present invention, the radio telecommunication apparatus enables the user to register a new PIN. The system also enables the user to read the registered PIN with the use of a password. In this case, if the password is not identical to a prestored one, the PIN is not displayed. This can prevent the PIN from being read by an unexpected person.

Also, if in the mobile radio telecommunication system of the present invention, the radio telecommunication apparatus determines that it does not receive the PIN transmission request signal from the base station, it notifies the user of the reception failure by a message displayed on its display or by a beep sound or a synthetic sound generated therefrom. Thus, the user can reliably know the reception failure of the PIN transmission request signal from the base station.

In addition, the radio telecommunication apparatus employed in the mobile radio telecommunication system of the present invention reads a PIN corresponding to a system ID number imparted by a base station, and transmits the read PIN to the base station via a radio channel. Therefore, in the case of the cellular mobile radio telephone system, for example, PINs corresponding to system ID numbers used in a plurality of service areas can be transmitted during roaming so as to connect the radio channel between the mobile telephone and the base station. Thus, the mobile radio telephone of the present invention is very convenient.

Furthermore, in the mobile radio telecommunication system of the present invention, the radio telecommunication apparatus reads a PIN corresponding to a system ID number imparted by a base station, and transmits, to the base station, a PIN corresponding to another system ID number when the PIN corresponding to the first-mentioned system ID number is not stored. Thus, in the cellular mobile radio telephone system, for example, the radio channel connection can be performed automatically using one of a home ID number and a roaming ID number, which makes the radio telephone more convenient.

Additional advantages and modifications will readily occur to those skilled in the art. Therefore, the present invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. A radio telecommunication apparatus for use in a radio telecommunication system, wherein the radio telecommunication system encompasses a plurality of areas each having one or more base units which communicates with said radio telecommunication apparatus over one or more radio channels within the areas of said base units, said radio telecommunication apparatus comprising:

a memory for storing an identification number which is indicative of said radio telecommunication apparatus and is known to a user of said radio telecommunication apparatus;

an input device for inputting predetermined information;

transmitting means for transmitting to one of said base units a first signal which corresponds to the predetermined information and for, in response to a second signal which is transmitted from said one of said base units and requests the transmission of the identification number, reading out the identification number from said memory and transmitting to said one of said base units a third signal which corresponds to the identification number; and determining means for determining whether or not the second signal is received within a predetermined period of time after the transmission of the first signal.

2. The apparatus according to claim 1, wherein said determining means includes means for counting the predetermined time period.

3. The apparatus according to claim 1, further comprising: means for releasing a corresponding radio channel when said determining means determines that the second signal is not received.

4. The apparatus according to claim 3, further comprising: informing means for informing a user of a failure to receive the second signal when said determining means determines that the second signal is not received.

5. The apparatus according to claim 4, wherein said informing means includes a display.

6. The apparatus according to claim 4, wherein said informing means includes means for generating a synthetic sound.

7. The apparatus according to claim 4, wherein said informing means includes means for generating a beep sound.

8. A radio telecommunication apparatus for use in a radio telecommunication system, wherein the radio telecommunication system encompasses a plurality of areas each having one or more base units which communicates with said radio telecommunication apparatus over one or more radio channels within the areas of said base units, said radio telecommunication apparatus comprising:

a memory for storing an identification number which is indicative of said radio telecommunication apparatus and is known to a user of said radio telecommunication apparatus;

an input device for inputting predetermined information;

transmitting means for transmitting to one of said base units a first signal which corresponds to the predetermined information and for, in response to a second signal which is transmitted from said one of said base units and requests the transmission of the identification number, reading out the identification number from said memory and transmitting to said one of said base units a third signal which corresponds to the identification number; and determining means for determining whether or not the second signal is received before the number of times the predetermined information is input by said input device reaches a predetermined count.

9. The apparatus according to claim 8, further comprising means for counting a number of call originations.

10. The apparatus according the claim 8, further comprising means for releasing a corresponding radio channel when said determining means determines that the second signal is not received.

11. The apparatus according the claim 10, further comprising:

informing means for informing a user of a failure to receive the second signal when said determining means determines that the second signal is not received.

12. The apparatus according to claim 11, wherein said informing means includes a display.

13. The apparatus according to claim 11, wherein said informing means includes means for generating a synthetic sound.

14. The apparatus according to claim 11, wherein said informing means includes means for generating a beep sound.

15. A mobile telecommunication apparatus, comprising:

a memory for storing a personal identification number (PIN);

a receiver for receiving a PIN transmission request signal from a base unit requesting transmission of the PIN to said base unit;

a control circuit for retrieving the PIN from said memory in response to the PIN transmission request signal; and a transmitter for transmitting the retrieved PIN to said base unit, wherein said receiver receives a PIN guidance signal prior to the PIN transmission request signal, said apparatus prompts a user for an input in response to the PIN guidance signal, said transmitter transmits a signal to said base unit based on the user input, said control unit determines whether or not the PIN transmission request signal is received within a predetermined period of time after the signal based on the user input is transmitted to said base unit, and a termination process for terminating communication between said apparatus and said base unit is suspended until the predetermined period of time lapses.

16. A mobile telecommunication apparatus, comprising:

a memory for storing a personal identification number (PIN);

a receiver for receiving a PIN transmission request signal from a base unit requesting transmission of the PIN to said base unit;

a control circuit for retrieving the PIN from said memory in response to the PIN transmission request signal; and a transmitter for transmitting the retrieved PIN to said base unit, wherein said receiver receives a PIN guidance signal prior to the PIN transmission request signal, said apparatus prompts a user for an input in response to the PIN guidance signal, said transmitter transmits a signal to said base unit based on the user input, said control unit counts the number of user inputs in response to the PIN guidance signal, and a termination process for terminating communication between said apparatus and said base unit is suspended until the number of user inputs reaches a predetermined count.

17. A mobile telecommunication apparatus, comprising:

a memory for storing a personal identification number (PIN);

a receiver for receiving a PIN transmission request signal from a base unit requesting transmission of the PIN to said base unit;

a control circuit for retrieving the PIN from said memory in response to the PIN transmission request signal; and a transmitter for transmitting the retrieved PIN to said base unit, wherein said receiver receives a PIN guidance signal prior to the PIN transmission request signal and said transmitter automatically transmits a signal to said base unit in response to the PIN guidance signal, said transmitter automatically transmits additional signals to said base unit if the PIN transmission request signal is not received, said control unit counts the number of signals automatically transmitted to said base unit, and a termination process for terminating communication between said apparatus and said base unit is suspended until the number of automatically transmitted signals reaches a predetermined count.

* * * * *